(12) United States Patent
Britchford et al.

(10) Patent No.: US 8,925,330 B2
(45) Date of Patent: Jan. 6, 2015

(54) FLOW DISCHARGE DEVICE

(75) Inventors: Kevin M. Britchford, Loughborough (GB); Nicolas L. Balkota, Derby (GB)

(73) Assignee: Rolls-Royce PLC, London (GB)

( * ) Notice: Subject to any disclaimer, the term of this patent is extended or adjusted under 35 U.S.C. 154(b) by 980 days.

(21) Appl. No.: 12/967,359

(22) Filed: Dec. 14, 2010

(65) Prior Publication Data

US 2011/0167834 A1 Jul. 14, 2011

(30) Foreign Application Priority Data

Jan. 12, 2010 (GB) .................................. 1000378.8

(51) Int. Cl.
| | |
|---|---|
| *F02C 6/04* | (2006.01) |
| *F02K 3/075* | (2006.01) |
| *F01D 17/10* | (2006.01) |
| *F01D 17/14* | (2006.01) |
| *F02C 6/08* | (2006.01) |
| *F02C 7/24* | (2006.01) |
| *F02C 9/18* | (2006.01) |

(52) U.S. Cl.
CPC .............. *F02K 3/075* (2013.01); *F01D 17/105* (2013.01); *F01D 17/145* (2013.01); *F02C 6/08* (2013.01); *F02C 7/24* (2013.01); *F02C 9/18* (2013.01); *F05D 2260/96* (2013.01)
USPC ................. 60/785; 60/782; 60/795; 415/114; 415/144; 416/92; 416/96 R; 416/97 R

(58) Field of Classification Search
USPC .................... 60/785, 782, 795; 415/115, 144; 416/92, 96 R, 97 R
See application file for complete search history.

(56) References Cited

U.S. PATENT DOCUMENTS

| | | | | |
|---|---|---|---|---|
| 4,177,780 | A * | 12/1979 | Pellerin | 123/590 |
| 6,343,672 | B1 * | 2/2002 | Petela et al. | 181/224 |
| 6,588,195 | B2 | 7/2003 | Negulescu | |
| 7,387,489 | B2 * | 6/2008 | Appleby et al. | 415/144 |
| 2007/0261410 | A1 * | 11/2007 | Frank et al. | 60/785 |

(Continued)

FOREIGN PATENT DOCUMENTS

| | | |
|---|---|---|
| EP | 1 106 786 A2 | 6/2001 |
| EP | 1 801 403 A2 | 6/2007 |

(Continued)

OTHER PUBLICATIONS

British Search Report issued in Great Britain Patent Application No. 1000378.8 on May 12, 2010.

(Continued)

*Primary Examiner* — Craig Kim
(74) *Attorney, Agent, or Firm* — Oliff PLC

(57) ABSTRACT

The present invention relates to a flow discharge device (30) for discharging a flow of gas (F) from a first gaseous fluid (A) into a second gaseous fluid (B) which is of a lower pressure than the first gaseous fluid. The discharge device comprises a valve (34) disposed between the first and second gaseous fluids and arranged to regulate the discharge flow (F) and a swirler means (50) disposed between the valve (34) and the second gaseous fluid. The swirler means (50) comprises a plurality of radially extending circumferentially spaced vanes (61, 63, 65). In use the swirler means (50) swirls the discharge flow (F). This acts to reduce the energy, and therefore the pressure of the discharge flow. This results in quieter operation.

14 Claims, 4 Drawing Sheets

(56) References Cited

U.S. PATENT DOCUMENTS

Figure 1:
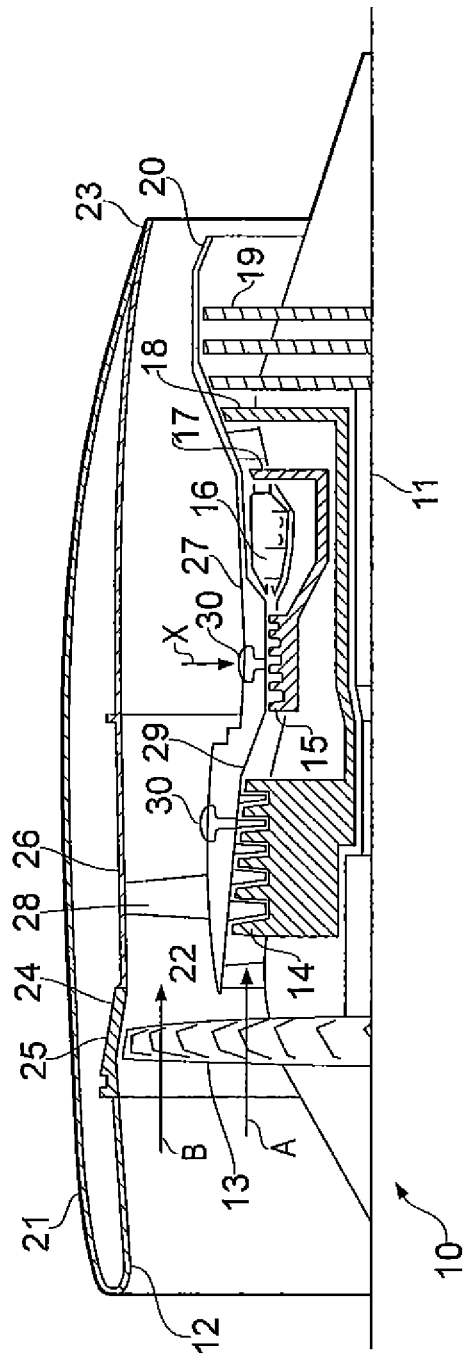

| | | | | |
|---|---|---|---|---|
| 2008/0050218 | A1* | 2/2008 | Sokhey | 415/119 |
| 2008/0179132 | A1* | 7/2008 | Hunt et al. | 181/224 |
| 2010/0276022 | A1* | 11/2010 | Moosmann et al. | 137/613 |

FOREIGN PATENT DOCUMENTS

| | | |
|---|---|---|
| EP | 1 881 161 A2 | 1/2008 |
| EP | 1 892 399 A2 | 2/2008 |
| EP | 1 914 393 A2 | 4/2008 |
| EP | 2 136 053 A2 | 12/2009 |
| EP | 2 184 447 A2 | 5/2010 |
| GB | 2 376 515 A | 12/2002 |
| GB | 2 443 418 A | 5/2008 |
| WO | WO 2006/091138 A1 | 8/2006 |
| WO | WO 2009092488 A1 * | 7/2009 |

OTHER PUBLICATIONS

Apr. 14, 2014 European Search Report issued in European Patent Application No. EP 10 19 4834.

* cited by examiner

FLOW DISCHARGE DEVICE

The present invention relates to a flow discharge device, in particular, a flow discharge device for discharging a flow of gas from a first gaseous fluid into a second gaseous fluid which is of a lower pressure than the first gaseous fluid.

When a gas turbine engine is operating at low speed or under transient conditions, for example when accelerating or decelerating, it may be necessary to bleed air at high pressure from the core gas flow through the engine. Such air may be discharged through a discharge device into a bypass flow within the engine. Bleed valves are provided to control the discharge of air. The flow of bleed air from the core gas flow into the bypass flow takes place with a substantial pressure drop, and supersonic flow can occur, thereby generating significant noise. It is therefore usual for the discharge device to be configured so as to reduce the noise.

A typical measure is to discharge the bleed air into the bypass duct through a perforated plate, sometimes referred to as a "pepper pot" which is flush with the inner wall of the bypass duct. The pepper pot serves to break the single body of air flowing towards the bypass duct into a large number of smaller jets which promote small-scale turbulence and hence quicker mixing with the main flow through the bypass duct. Whilst this reduces the noise generated by the flow of bleed air into the bypass duct to some extent, supersonic flow can still occur if the air is accelerated too rapidly through the pepper pot. The noise reduction is therefore not sufficient for some modern engines.

In an attempt to address this issue, in a previously considered arrangement the pressure of the bleed air is reduced over a number of stages using multiple pepper pots. However, due to limited space within the engine it is difficult to achieve the required pressure drop downstream of each pepper pot.

According to a first aspect of the present invention there is provided a flow discharge device for discharging a discharge flow of gas from a first gaseous fluid into a second gaseous fluid which is at a lower pressure than the first gaseous fluid, the device comprising: a valve disposed between the first and second gaseous fluids and arranged to regulate the discharge flow; and a swirler (or swirl-inducing) means disposed in the discharge flow path between the valve and the second gaseous fluid and having a plurality of vanes; wherein the vanes of the swirler means are angled with respect to the discharge flow direction to swirl the discharge flow, thereby creating a turbulent flow.

The swirler means acts to create a turbulent flow which reduces the pressure of the discharge flow and improves mixing. Therefore, the discharge flow is not accelerated to such a high velocity in order obtain the required pressure drop. This reduces the noise of the system when compared with conventional designs.

Preferably the vanes of the swirler means are radially extending and circumferentially spaced with respect to the discharge flow direction.

The swirler means may comprise a hub and an outer annulus wherein the vanes extend between the hub and the outer annulus.

In a preferred embodiment the swirler means is a counter-rotating swirler. This increases the amount of turbulence generated and therefore improves mixing. The counter-rotating swirler may comprise a first set of vanes and a second set of vanes radially spaced from the first set of vanes, wherein the vanes of the first set of vanes and the vanes of the second set of vanes are angled relative to the axis of the swirler in opposite directions. Further, the counter rotating swirler may comprise a third set of vanes radially spaced from the first and second set of vanes, wherein the vanes of the third set of vanes are angled relative to the axis of the swirler in an opposite direction to the vanes of the second set of vanes.

Preferably the flow discharge device further comprises a bleed duct within which is located the swirler means, wherein when the valve is open the bleed duct provides the fluid path for the discharge flow.

In a preferred arrangement the flow discharge device further comprises a diffuser located between the swirler means and the second gaseous fluid, the diffuser comprising an aperture, wherein in use the discharge flow is discharged through the aperture into the second gaseous fluid. The diffuser may comprise a plurality of apertures.

The swirler means may be arranged to generate a free or a forced vortex in the discharge flow. The exit angle of the vanes may be arranged at an angle between about 20° to 60° to the axis of the swirler means.

The counter-rotating swirler may comprise a hub, a first annulus and a second annulus, the first set of vanes extend between the hub and the first annulus and the second set of vanes extend between the first annulus and the second annulus. The first and second sets of vanes have an exit angle, the exit angle of the first set of vanes may be arranged at an angle between about 20° to 60° to the axis of the swirler means and the exit angle of the second set of vanes may be arranged at an angle between about −20° to −60° to the axis of the swirler means.

The counter-rotating swirler may comprise a hub, a first annulus, a second annulus and an outer annulus, the first set of vanes extend between the hub and the first annulus, the second set of vanes extend between the first annulus and the second annulus and the third set of vanes extend between the second annulus and the outer annulus. The first, second and third sets of vanes have an exit angle, the exit angle of the first set of vanes may be arranged at an angle between about 20° to 60° to the axis of the swirler means, the exit angle of the second set of vanes may be arranged at an angle between about −20° to −60° to the axis of the swirler means and the exit angle of the third set of vanes may be arranged at an angle between about 20° to 60° to the axis of the swirler means.

The swirler means may comprises a plurality of swirlers arranged in flow series.

Depending on the configuration of the system this may improve mixing.

The invention also relates to a gas turbine engine provided with a flow discharge device according to any statement herein, wherein the first gaseous fluid is a flow of air in the compressor of the gas turbine engine, the second gaseous fluid is a flow of air in a bypass duct of the gas turbine engine, and the discharge device comprises a compressor bleed assembly.

The invention may comprise any combination of the features and/or limitations referred to herein, except combinations of such features as are mutually exclusive.

Figure 2:
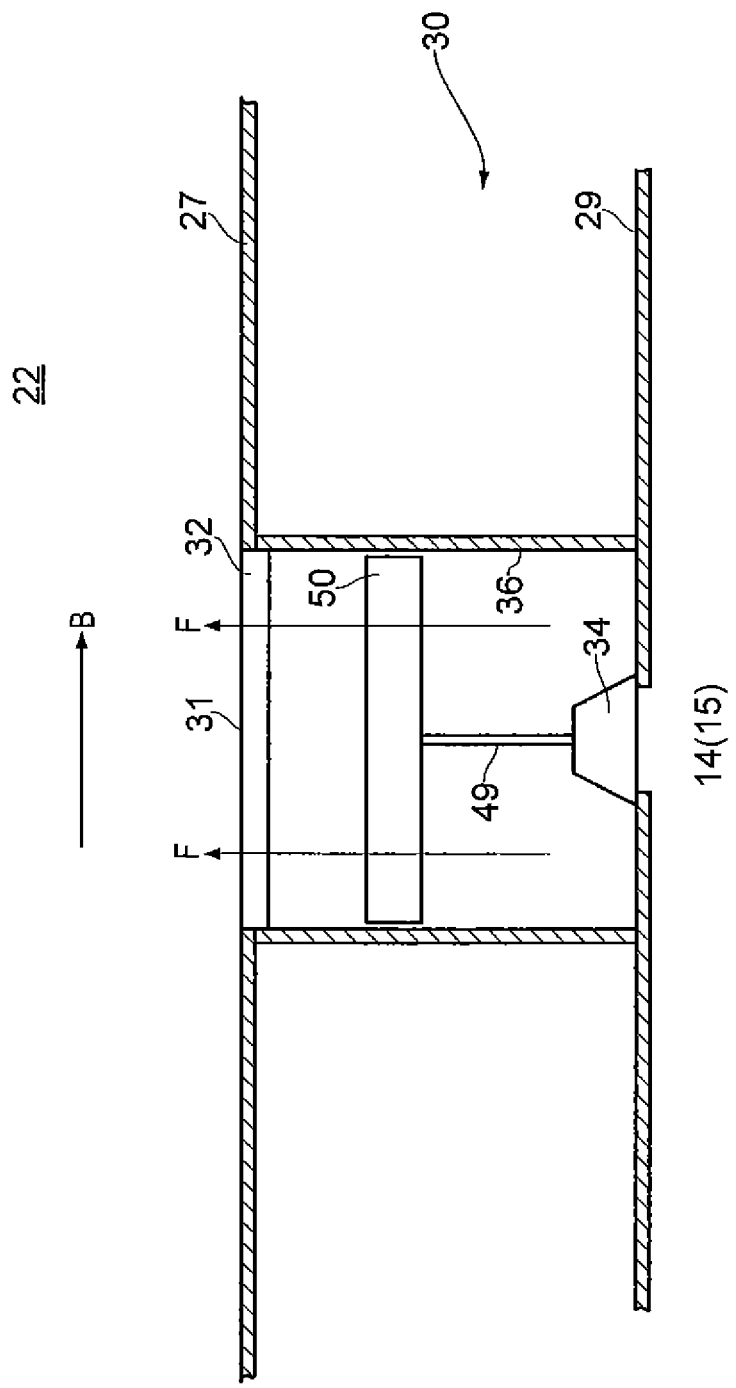
Figure 3:
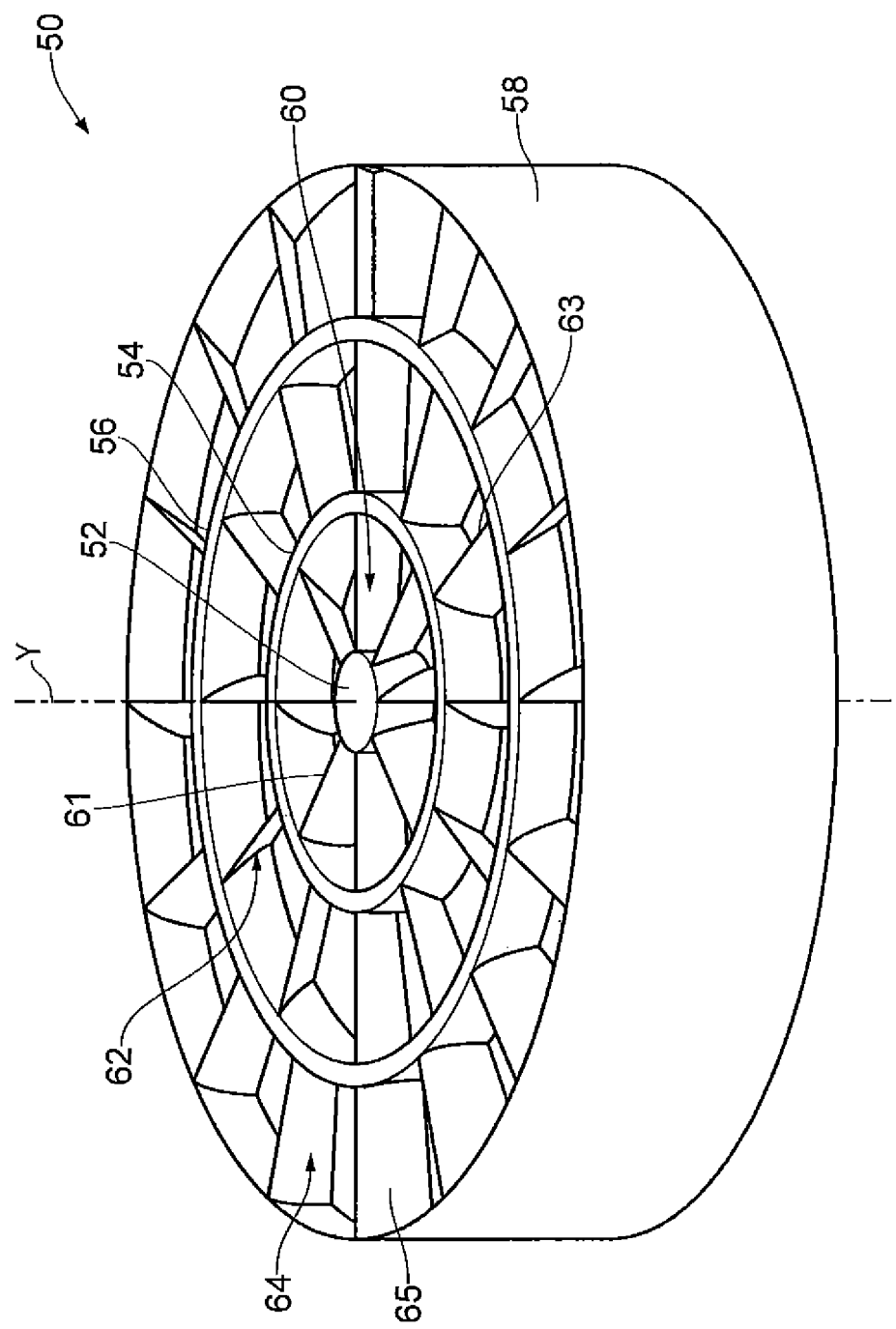

Embodiments of the present invention will now be described, by way of example only, with reference to the accompanying drawings, in which:

FIG. 1 is a schematic sectional view of a gas turbine engine;

FIG. 2 schematically shows a flow discharge device according to the present invention;

FIG. 3 schematically shows an enlarged view of the swirler of FIG. 2; and

Figure 4:
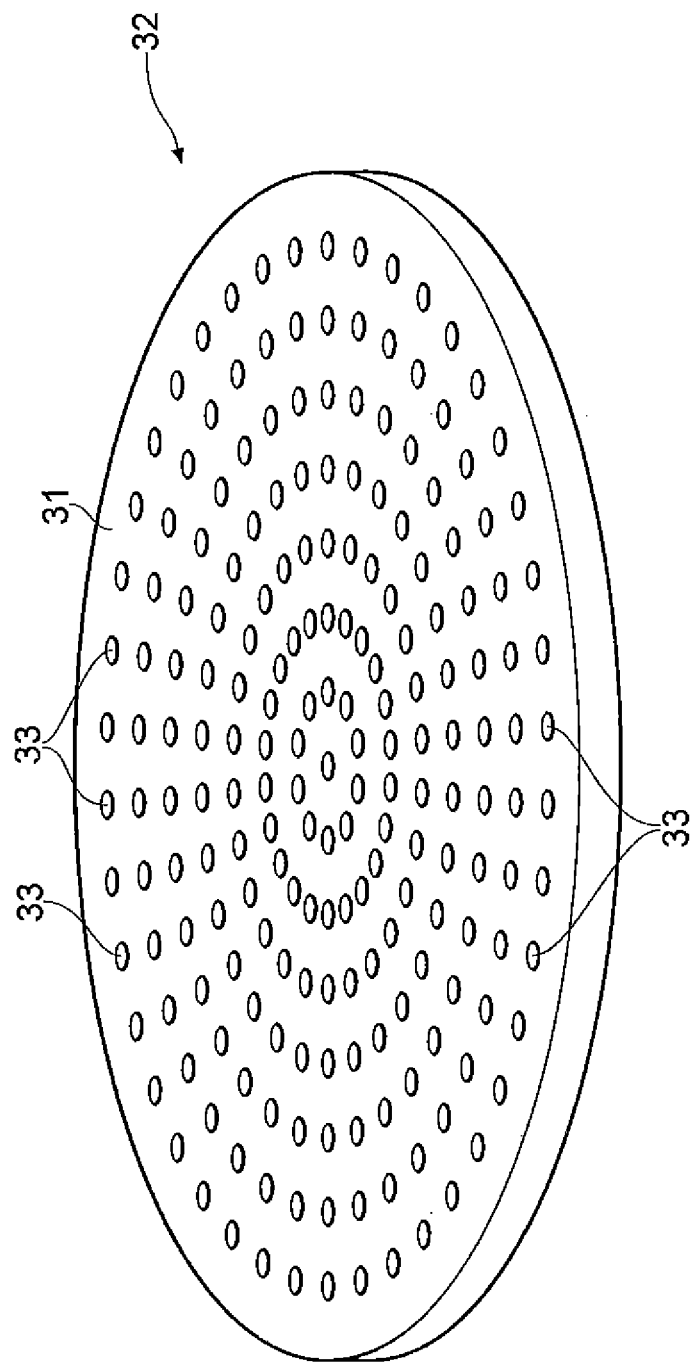

FIG. 4 schematically shows an enlarged view of the diffuser of FIG. 2.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached inwardly thereto is a rear fan casing 26. The bypass duct 22 is defined between the rear fan casing 26 and an inner wall 27. The inner wall 27 is spaced outwardly from a compressor casing structure 29 which accommodates the intermediate and high pressure compressors 14, 15.

During engine operation and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from a downstream part of a compressor 14, 15. Operation of a bleed assembly 30 and engine operability are described in "The Jet Engine" 6th Edition, 2005, Rolls-Royce plc, pages 79-80, and details of such operation will therefore only be briefly mentioned herein.

Referring now to FIG. 2, the bleed assemblies 30 each open onto the bypass duct 22 at a discharge surface 31 of a diffuser 32 (otherwise known as and hereinafter referred to as a pepper pot). Each bleed assembly 30 comprises a bleed valve 34 which is in fluid communication with the respective compressor 14, 15 through the casing structure 29. The bleed valve 34 is located within a bleed duct 36 which provides fluid communication between the compressor 14, 15 and the bypass duct 36 when the bleed valve 34 is open.

A counter-rotating swirler 50 is fixedly located within the bleed duct 36 between the bleed valve 34 and the pepper pot 32. The swirler 50 is attached to the housing of the bleed valve 34 using a rod 49.

With reference to FIG. 3 the swirler 50 comprises a hub 52, a first annulus 54, a second annulus 56 and an outer annulus 58, all arranged coaxially about an axis Y. A first set of vanes 60 is located between the hub 52 and the first annulus 54, a second set of vanes 62 is located between the first annulus 54 and the second annulus 56 and a third set of vanes 64 is located between the second annulus 56 and the outer annulus 58. The first set of vanes 60 comprises a plurality of vanes 61 spaced circumferentially and radially extending between the hub 52 and the first annulus 54. The second set of vanes 62 comprises a plurality of vanes 63 spaced circumferentially and radially extending between the first annulus 54 and the second annulus 56. The third set of vanes 64 comprises a plurality of vanes 65 spaced circumferentially and radially extending between the second annulus 56 and the outer annulus 58.

The first, second and third sets of vanes 60, 62, 64 are inclined to the axis Y of the swirler 50. The first and third sets of vanes 60, 64 are inclined in an opposite direction to the second set of vanes 62. The exit angle of the first and third sets of vanes 60, 64 may be disposed at an angle between about 20° to about 60° to the axis Y of the swirler 50 and the exit angle of the second set of vanes may be disposed at an angle between about −20° to about −60° to the axis Y of the swirler 50. As will be readily apparent to one skilled in the art, other suitable vane angles may be used.

The swirler 50 (or swirl-inducing means) is itself stationary and is arranged to swirl (or rotate) fluid passing through it. The vanes 61, 63, 65 act to apply angular momentum to the fluid passing through the swirler, thereby swirling the fluid.

Although it has been described above that the swirler 50 is a counter-rotating swirler having three sets of vanes, in other embodiments the swirler may be a counter-rotating swirler having two sets of vanes or a swirler having a single set of vanes. Further, as opposed to using a single swirler 50, a plurality of axially spaced swirlers may be used, e.g. a plurality of swirlers which are arranged in flow series may be used.

The vanes may be arranged to generate either a free (irrotational) vortex or a forced (rotational) vortex depending on the operating requirements.

As will be readily apparent to one skilled in the art and as shown in FIG. 4, the pepper pot 32 comprises a metal disc having a plurality of apertures 33 through the thickness of the disc.

In operation of the engine shown in FIG. 1, parts of the core engine air flow A may be diverted through the bleed assembly 30 in order to optimise the performance of the respective compressors 14, 15. This is achieved by opening the bleed valve 34 of the respective bleed assembly 30. The open bleed valve 34 permits air at high pressure to pass through the casing structure 29 into the bleed duct 36.

The flow of high-pressure air F that enters the bleed duct 36 passes through the stationary swirler 50 before passing through the pepper pot 32 into the bypass flow B in the bypass duct 22. The fixed vanes of the swirler 50 cause the flow of air F in the bleed duct 36 to be swirled (or rotated). A first annular portion of the air flow F is swirled by the first vane set 60 in a clockwise direction, a second annular portion of the air flow F is swirled by the second vane set 62 in an anti-clockwise direction and a third annular portion of the air flow F is swirled by the third vane set 64 in a clockwise direction. The swirler 50 therefore acts to create a turbulent air flow F which reduces the energy, and therefore the pressure, of the air.

The swirler 50 enhances the mixing of the bleed air flow F which leads to a more rapid reduction of total pressure when compared to conventional designs. The swirler 50 also ensures that the bleed air flow F is spread evenly across all of the available area of the bleed duct 36, thereby maximising the use of the available space which in turn provides a quieter design. The pressure of the bleed air flow F is reduced by accelerating the flow to increase its dynamic pressure which is then lost by creating a turbulent flow of air which is then subsequently converted to heat.

To minimise the highest flow velocity in the bleed assembly 30 the flow is reaccelerated a number of times, first through the bleed valve 34 and then through a pepper pot 32 before discharging the bleed flow F into the bypass flow B.

The swirler 50 acts to reduce the energy of the bleed air flow F. The more rapidly energy is lost, the less the flow has to be reaccelerated. Since the swirler 50 reduces the energy of the bleed flow F, the pepper pot 32 does not have to accelerate the air flow to such a high velocity in order to reduce the pressure. By lowering the maximum velocity, and in particular by avoiding shock waves, the lower the noise of the system.

The invention claimed is:

1. A flow discharge device for discharging a discharge flow of gas from a first gaseous fluid into a second gaseous fluid which is at a lower pressure than the first gaseous fluid, the device comprising:
    a valve disposed between the first and second gaseous fluids and arranged to regulate the discharge flow; and
    a swirler arrangement disposed in the discharge flow path between the valve and the second gaseous fluid and having a plurality of vanes,
    wherein the vanes of the swirler arrangement are angled with respect to the discharge flow direction to swirl the discharge flow, thereby creating a turbulent flow,
    the vanes of the swirler arrangement are radially extending and circumferentially spaced with respect to the discharge flow direction, and
    the swirler comprises a first set of vanes and a second set of vanes radially spaced from the first set of vanes, wherein the vanes of the first set of vanes and the vanes of the second set of vanes are angled relative to the axis of the swirler in opposite directions.

2. A flow discharge device according to claim 1, wherein the swirler comprises a third set of vanes radially spaced from the first and second set of vanes, wherein the vanes of the third set of vanes are angled relative to the axis of the swirler in an opposite direction to the vanes of the second set of vanes.

3. A flow discharge device according to claim 1, wherein the swirler comprises a hub, a first annulus and a second annulus, the first set of vanes extend between the hub and the first annulus and the second set of vanes extend between the first annulus and the second annulus.

4. A flow discharge device according to claim 3 wherein the first and second sets of vanes have an exit angle, the exit angle of the first set of vanes is arranged at an angle between about 20° to 60° to the axis of the swirler arrangement and the exit angle of the second set of vanes is arranged at an angle between about −20° to −60° to the axis of the swirler arrangement.

5. A flow discharge device according to claim 2, wherein the swirler comprises a hub, a first annulus, a second annulus and an outer annulus, the first set of vanes extend between the hub and the first annulus, the second set of vanes extend between the first annulus and the second annulus and the third set of vanes extend between the second annulus and the outer annulus.

6. A flow discharge device according to claim 3 wherein the first, second and third sets of vanes have an exit angle, the exit angle of the first set of vanes is arranged at an angle between about 20° to 60° to the axis of the swirler arrangement, the exit angle of the second set of vanes is arranged at an angle between about −20° to −60° to the axis of the swirler arrangement and the exit angle of the third set of vanes is arranged at an angle between about 20° to 60° to the axis of the swirler arrangement.

7. A flow discharge device according to claim 1, further comprising
    a bleed duct within which is located the swirler arrangement, wherein when the valve is open the bleed duct provides the fluid path for the discharge flow.

8. A flow discharge device according to claim 1, further comprising
    a diffuser located between the swirler arrangement and the second gaseous fluid, the diffuser comprising an aperture, wherein in use the discharge flow is discharged through the aperture into the second gaseous fluid.

9. A gas turbine engine comprising a compressor, a bypass duct and a compressor bleed assembly for discharging a discharge flow of air in the compressor of the gas turbine engine into a flow of air in a bypass duct of the gas turbine engine which is at a lower pressure than the flow of air in the compressor, the compressor bleed assembly comprising:
    a bleed duct which provides fluid communication between the compressor and the bypass duct;
    a valve disposed in the bleed duct between the flow of air in the compressor and the flow of air in the bypass duct and arranged to regulate the discharge flow; and
    a swirler arrangement disposed in the bleed duct between the valve and the air in the bypass duct, the swirler having a plurality of vanes;
    wherein the vanes of the swirler arrangement are angled with respect to the discharge flow direction to swirl the discharge flow, thereby creating a turbulent flow,
    the vanes of the swirler arrangement are radially extending and circumferentially spaced with respect to the discharge flow direction, and
    the swirler arrangement comprises a hub and an outer annulus and the vanes extend between the hub and the outer annulus, the outer annulus having a first end and a second end axially spaced from the first end, the first end of the outer annulus and the hub defining an inlet to the swirler arrangement, the second end of the outer annulus and the hub defining an outlet of the swirler arrangement.

10. A flow discharge device according to claim 9, wherein the swirler arrangement is arranged to generate a free or a forced vortex in the discharge flow.

11. A flow discharge device according to claim 9, wherein the vanes have an exit angle, the exit angle of the vanes is arranged at an angle between about 20° to 60° to the axis of the swirler arrangement.

12. A flow discharge device according to claim 9, further comprising
    a diffuser located between the swirler arrangement and the air in the bypass duct, the diffuser comprising an aperture, wherein in use the discharge flow is discharged through the aperture into the air in the bypass duct.

13. A flow discharge device according to claim 12, wherein the diffuser comprises a plurality of apertures.

14. A flow discharge device according to claim 8, wherein the diffuser comprises a plurality of apertures.

\* \* \* \* \*